Jan. 10, 1933. J. G. HEASLET 1,893,775
STEERING LEVER CONTROL
Filed July 23, 1931
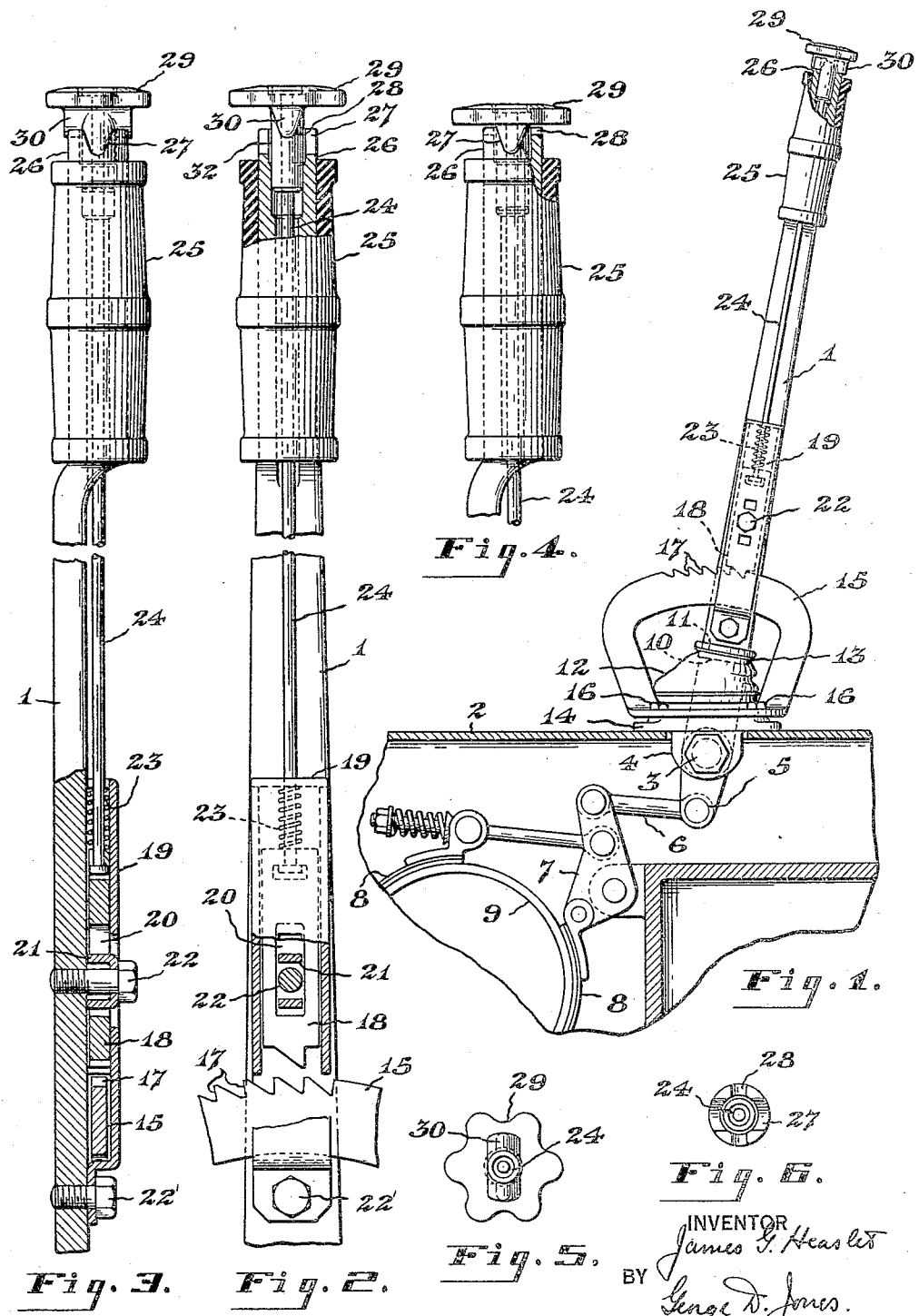

Patented Jan. 10, 1933

1,893,775

UNITED STATES PATENT OFFICE

JAMES G. HEASLET, OF SHAKER HEIGHTS, OHIO, ASSIGNOR TO THE CLEVELAND TRACTOR COMPANY, OF CLEVELAND, OHIO

STEERING LEVER CONTROL

Application filed July 23, 1931. Serial No. 552,685.

This invention relates to steering control levers, and it has particular relation to such control means as are employed in connection with steering tractors, and more especially tractors of the track laying type, wherein levers are used for this purpose.

Two methods of steering control are used, namely the contracting of bands around a drum mounted on each side of a differential; and the clutching and declutching method, wherein a clutch is mounted on each side of the final drive.

It has been customary in the past to use simple lever arms to operate the steering mechanism used on tractors of the track laying type, these levers being manually operated, and when pulled back, set the steering mechanism in action whereby the tractor can be guided with very little effort. It has been found that during certain movements of track laying tractors operating in conditions that require steering in one direction a major portion of the time, that the manually held steering lever arm is not entirely satisfactory due to the tiring effect upon the operator as well as keeping one hand in constant use when it is required for other work such as regulating the operation of the pushed or pulled implement which is attached to the tractor.

In some types of tractors the steering lever arm is associated with the conventional ratchet and quadrant, wherein a pawl is in constant contact with the ratchet teeth located on a quadrant, unless released and manually held in such released position. With this type of steering lever arm associated with a conventional ratchet mechanism, it becomes difficult to steer a tractor due to the constant holding of the ratchet against a forward movement and the constant releasing of the same by the operator, therefore this has long been an objectional feature in steering by lever and ratchet control means.

Therefore, an object of this invention is to provide a steering lever arm for controlling the steering mechanism of track laying tractors which will eliminate the objectional feature of constant hand pressure on the ratchet mechanism to release the same from locking the steering lever arm in a fixed position.

Another object of this invention is to provide a lever arm associated with a ratchet mechanism whereby the pawl of the ratchet mechanism may be held out of engagement with the ratchet teeth and whereby the pawl may be brought into engagement with the ratchet teeth by releasing the locking mechanism.

These and other embodiments of this invention are clearly set forth in specifications and shown in the drawing, in which:—

Fig. 1 is a side elevation of the steering lever connected to the steering band of any suitable steering mechanism.

Fig. 2 is an enlarged side elevational view of the lever shown in Fig. 1, but with the pawl held out of engagement.

Fig. 3 is an enlarged rear elevational view of the lever shown in Fig. 2.

Fig. 4 is an elevational view from the upper position of the lever similar to Fig. 3 but with the hand knob in released position.

Fig. 5 is a bottom view of the hand knob.

Fig. 6 is a top plan view of the lever arm.

The lever arm 1 is attached to the transmission housing 2 of a tractor, by a pivot member which is preferably a bolt 3, screwed into a boss 4 which projects from the transmission housing 2. The lever arm 1 extends below the pivot member 3 and an aperture 5 in its lower portion receives the link 6 connected to a bell crank 7 which operates the steering band 8 on the steering drum 9 when the lever arm is moved.

Located on the lever arm 1 and above the pivot member 3 is a collar 10 with a recessed portion 11 around which a boot 12 of any flexible material is secured by means of a wire clamp 13. The lower portion of the boot 12 is securely fastened to a transmission housing 2 by a plate 14 which is recessed around the upper portion thereof and the boot 12 is secured thereto by suitable securing means. To the plate 14 is secured the ratchet quadrant 15 by bolts 16 which pass through the plate 14 and are secured into the transmission housing 2. The ratchet quadrant 15 with the ratchet teeth 17 cut therein is located in relation to the lever arm 1 to permit contact of the lever arm 1 along the side thereof without binding, thereby allowing free and contacting movement longitudinally thereof.

Associated with the ratchet teeth 17 is a pawl 18 which is slidably held in position on the lever arm 1 by a pawl retainer housing 19 and limited in movement by a slot 20 in which is mounted a spacer member 21 through which a bolt 22 passes securing the retainer housing 19 and spacer member 21 rigidly to the lever arm 1. Attached to the upper portion of the pawl 18 by any suitable means is a pawl rod 24 which passes through a spring 23 held in position by the upper portion of the pawl retainer housing 19 and the top portion of the pawl 18. The spring 23 acting downwardly on the pawl, tends to hold the same in engagement with the ratchet teeth 17.

Located at the top portion of the lever arm 1 is a hand grip 25 preferably of a rubber composition which encloses the entire upper portion of the lever arm 1. The upper portion of operating lever 1 is of cylindrical form, as shown at 26, and the rubber hand grip 25 encircles this portion. An axial opening 32 is formed in the end of operating rod 1, to permit the pawl rod 24 to pass therethrough.

The end edge of operating lever 1 is provided with a transverse groove 27 bisected at a 90° angle by a more shallow concave slot 28, this structure being clearly shown in Fig. 6 of the drawing.

Directly below the hand grip 25, the lever arm is offset to permit the pawl rod 24 to operate adjacent thereto. The pawl rod 24 continues to the top of the operating lever 1, while securely mounted to the top end of the pawl rod 24 is a hand knob 29 of any suitable shape, though preferably annular with a nicked or scalloped peripheral edge so that the operator's hand may turn the same without slipping thereon. Projecting from the under side of the hand knob 29 is a V projection 30 formed integral therewith, and projecting diametrically through the axis thereof, and securely mounted thereto is pawl rod 24. See Fig. 5 for details.

It is understood that the above description and drawing describe and show one of a pair of steering arm levers common to track laying tractors, and that it is common practice in the manufacture of this type of tractor to use two levers for steering the tractor. In the operation of the above described device, the hand knob 29 is turned so that the V projection 30 on the bottom surface thereof is in contact with the concave groove 28 formed in the end edge of lever 1 thus withdrawing the pawl from contact with the ratchet teeth 17 on the quadrant 15. When the pawl is thus held, the lever is free to move in either direction and steering of the tractor is easily accomplished. This position of the parts is clearly disclosed in Figs. 2 and 3 of the drawing.

When it becomes necessary to steer the tractor in an angular direction, that is to the left or right for a long or short period of time or when it is necessary to hold the tractor in a straight line when traveling at right angles to an incline, the knob 29 is turned until the V projection 30 coincides with the V groove 27 which permits the rod 24 to move downwardly and the pawl 18 to engage the ratchet teeth 17 and thus hold the lever arm 1 in the desired position whereby the bands 8 are contracted around the drum 9 thus retarding the speed of the track on the side desired. This position of the parts is shown in Figs. 1 and 4 of the drawing.

If occasion arises where it is necessary to hold both drums for braking purposes, the two hand levers, with the pawls in operating position are drawn back and the bands are tightened on both drums thereby holding the tractor or allowing it to travel forward at reduced speed, depending upon the pressure applied to the lever arms.

Various changes can be made in the details of construction, shown and described, without departing from the spirit of my invention, and the scope of what is claimed.

What I claim is:—

A steering lever control mechanism, comprising a pivoted rock shaft, a notched quadrant mounted adjacent the base of said shaft, a movable pawl slidably affixed on the lower portion of said shaft adapted to engage the said notched quadrant, an operating rod swivelled to said pawl, the opposite end of the rod passing through a hand grip surrounding the upper section of the shaft, and a rotatable knob having depending lugs formed at 180° angles on the bottom side thereof fastened to the rod and adapted to selectively engage corresponding slots formed on the upper edge of the hand grip to insure positive engagement and disengagement of the pawl and quadrant notches.

In testimony whereof I affix my signature.

JAMES G. HEASLET.